United States Patent
Hawkins et al.

(10) Patent No.: US 10,625,985 B1
(45) Date of Patent: Apr. 21, 2020

(54) PEDESTRIAN CONVEYOR MASS DAMPER TO REDUCE STEP VIBRATION

(71) Applicant: KONE Corporation, Helsinki (FI)

(72) Inventors: Giovanni Hawkins, Helsinki (FI); Julian Justin, Helsinki (FI)

(73) Assignee: KONE CORPORATION, Helsinki (FI)

( * ) Notice: Subject to any disclaimer, the term of this patent is extended or adjusted under 35 U.S.C. 154(b) by 0 days.

(21) Appl. No.: 16/257,207

(22) Filed: Jan. 25, 2019

(51) Int. Cl.
*B66B 23/02* (2006.01)
*F16H 57/00* (2012.01)

(52) U.S. Cl.
CPC ....... *B66B 23/022* (2013.01); *F16H 57/0006* (2013.01)

(58) Field of Classification Search
CPC .......................... B66B 23/022; F16H 57/0006
See application file for complete search history.

(56) References Cited

U.S. PATENT DOCUMENTS

| 4,231,452 | A | * | 11/1980 | Kraft | B66B 29/00 188/171 |
| 5,566,810 | A | * | 10/1996 | Meyer | B66B 23/04 198/331 |
| 6,637,580 | B1 | * | 10/2003 | Sneed | B65G 21/00 198/326 |
| 6,892,874 | B2 | | 5/2005 | Pietz | |
| 7,011,207 | B2 | | 3/2006 | Suzuki et al. | |
| 2002/0132689 | A1 | | 9/2002 | Young | |
| 2005/0061608 | A1 | | 3/2005 | Pietz | |
| 2016/0031678 | A1 | * | 2/2016 | Srb-Gaffron | B66B 23/022 474/156 |
| 2018/0057315 | A1 | * | 3/2018 | Park | B66B 27/00 |

FOREIGN PATENT DOCUMENTS

GB          1506609 A  *  4/1978  ............. B66B 29/00

* cited by examiner

*Primary Examiner* — Mark A Deuble
(74) *Attorney, Agent, or Firm* — Birch, Stewart, Kolasch & Birch, LLP (57) ABSTRACT

A pedestrian conveyor includes a torsional vibration damper system, the torsional vibration damper system including a shaft, a cylindrical housing attached to the shaft and being configured to dampen vibrations of the shaft, a first gear, and a second gear.

20 Claims, 11 Drawing Sheets

PEDESTRIAN CONVEYOR MASS DAMPER TO REDUCE STEP VIBRATION

BACKGROUND OF THE INVENTION

1. Field of the Invention

This invention provides a solution for low frequency step oscillation using a tuned mass damper for reducing the polygon effect that occurs in a pedestrian conveyor, including an escalator or moving walkway. The damper is connected to the pedestrian conveyor via gears using a step up gearbox. The use of the gearbox significantly reduces the mass needed to make a tuned mass damper effective.

2. Description of the Background Art

Some escalator steps can vibrate at low frequency and feel very uncomfortable. Almost all escalator steps are driven by a chain sprocket system. Although this method of power transmission has several advantages in terms of reliability, the interaction of the step chain roller to sprocket will never be totally smooth and will have an excitation amplitude frequency termed as the polygon effect. Specifically, the linear speed of the chain of the chain sprocket system is not uniform, but varies during every cycle of its tooth engagement with the driven sprocket. This results in a pulsating (jerky motion) to the chain and the driven sprocket. This polygon effect is dependent on the number of teeth on the sprocket. The pulsating motion is pronounced when the number of teeth on the sprocket is less than 20. To get a large number of teeth on the sprocket, the sprocket size needs to increase which is not practical on escalators because of the space constrains.

Step chain bands are relatively elastic, and therefore have several natural frequencies in the range of this polygon effect frequency. This means that the dynamics of the step chain band will, in some cases, amplify the excitation caused by the polygon effect.

Conventional methods to address the polygon effect include reducing excitation by optimizing the sprocket teeth and guiding the chain onto a guide track.

For instance, Pietz (U.S. Pat. No. 6,892,874 B2) discloses a solution of active cancellation of excitation by superimposing a different rotational speed upon the rotational speed of the reversing wheel via the electric drive, which indirectly or directly acts upon the reversing wheel. However, the electric drive of Pietz is a direct drive system, and the method disclosed therein does not work on a chain driven system.

Other methods involve the control of step chain band dynamics, including stiffening up the chain to increase the natural frequency, or adding mass to the chain to drop the frequency.

SUMMARY OF THE INVENTION

The mass damper system of the present invention connects to the rotating or translating components of a pedestrian conveyer through gears to dampen vibrations/excitation forces to reduce pulsating motions inherent in chain driven systems to result in a smooth operation of the conveyor system.

The mass damper system of the present invention may work as a step up gearbox by having multiple gears, each of which may be sized in order to reduce the need for a large mass, generally, and thus reduce the size of the mass damper system. This reduced size may allow for retrofitting into any type of existing pedestrian conveyor systems.

The mass damper system of the present invention works by adding a rotational tuned mass damper to counteract the translational vibrations of the step by countering the resulting torsional oscillation of the whole system The invention involves adding a rotational tuned mass damper applied to a rotating gear/sprocket or translating chain of the pedestrian conveyor system.

The tuned mass damper of the present invention is designed to absorb vibration to divert at least some of the energy from passenger steps into the oscillating mass damper. However, the mass damper of the present invention may be designed to absorb substantially all of the vibration, which is produced during operation of the pedestrian conveyor.

The present invention is a completely passive system, which requires no electrical connection to a pedestrian conveyor controller, and dampens pulsations inherent in pedestrian conveyor systems, including the dampening of rotational and torsional vibrations.

Further, the present invention is inexpensive to produce and to implement, as it may be integrated to any chain or gear of known pedestrian conveyor systems by integrating the mass of a tuned mass damper with the mass of the system.

The torsional mass damper system may include a mass damper of any known type, such as a viscous damper (e.g., a harmonic balancer), or friction member based mass damper. The friction member based mass damper is also known as a torsional vibration damper, and is generally provided with a plurality of circumferentially spaced-apart weights, and friction members which engage with the housing or another component upon being exposed to vibration or other forces. The torsional mass damper system of the present invention may be attached to a shaft or to any other component of a pedestrian conveyor to reduce or eliminate pulsing by providing resistance to pulsing either by torsion or translation.

Lastly, the present invention may be retrofitted to any existing pedestrian conveyor, including any escalator or moving walkway, in order to reduce pulsing either by torsion or by translation.

Further scope of applicability of the invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
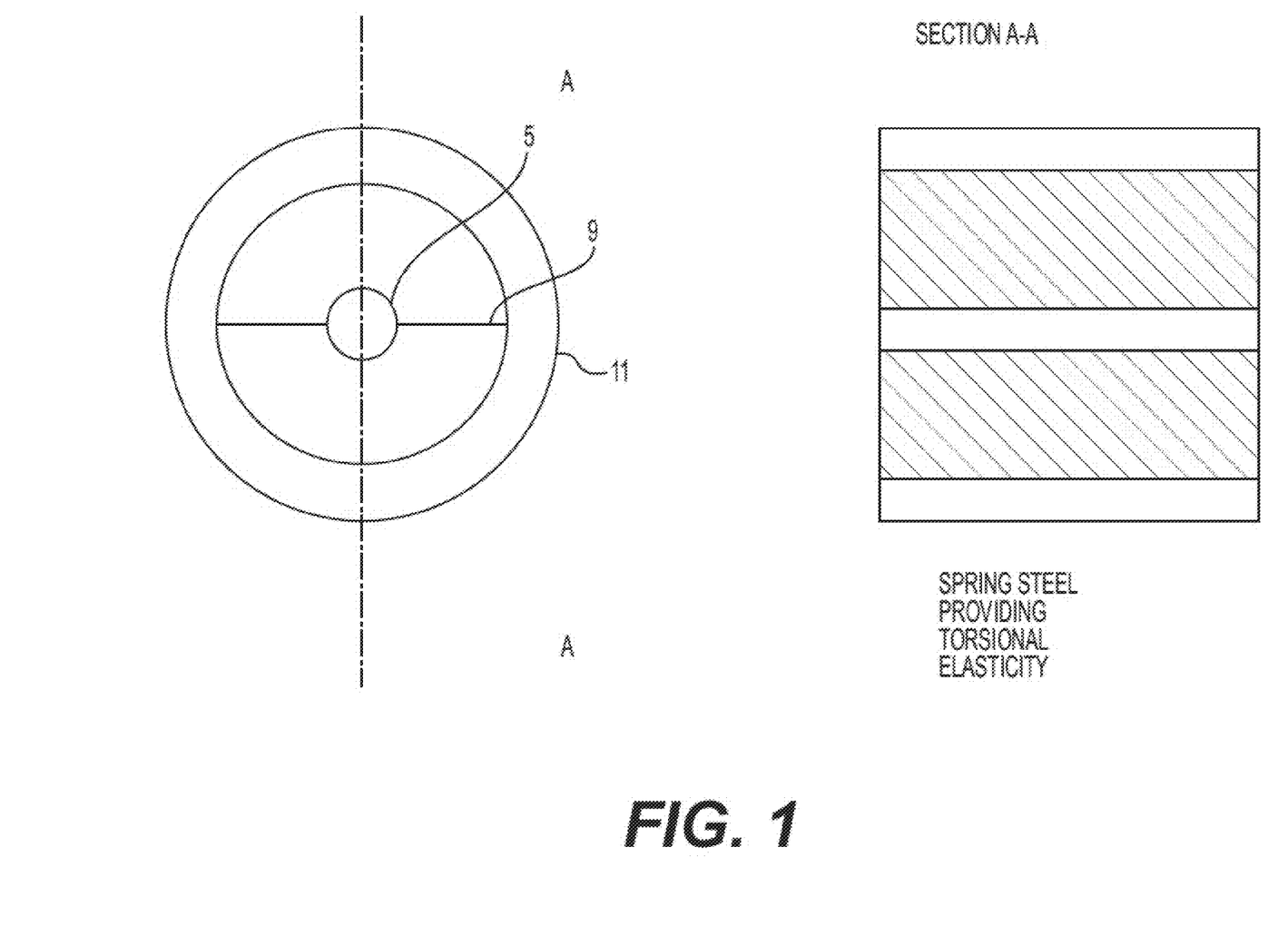
FIG. 1 illustrates a cross-sectional view of a tuned mass damper according to the present invention.

The present invention will now be described with reference to the accompanying drawings, wherein the same reference numerals have been used to identify the same or similar elements throughout the several views FIG. 1 illustrates a non-limiting embodiment of a torsional tuned mass damper 1 of the present invention that may be applied to a pedestrian conveyor, including an escalator or moving walkway. The mass damper system of FIG. 1 illustrates a rotating shaft 5 that is attached to a plurality of leaf springs/spring plates 9, and to drums/plurality of weights 11 that rotates during the operation of the pedestrian conveyor. The spring plates 9 may include spring steel to provide torsional elasticity.

Figure 2:
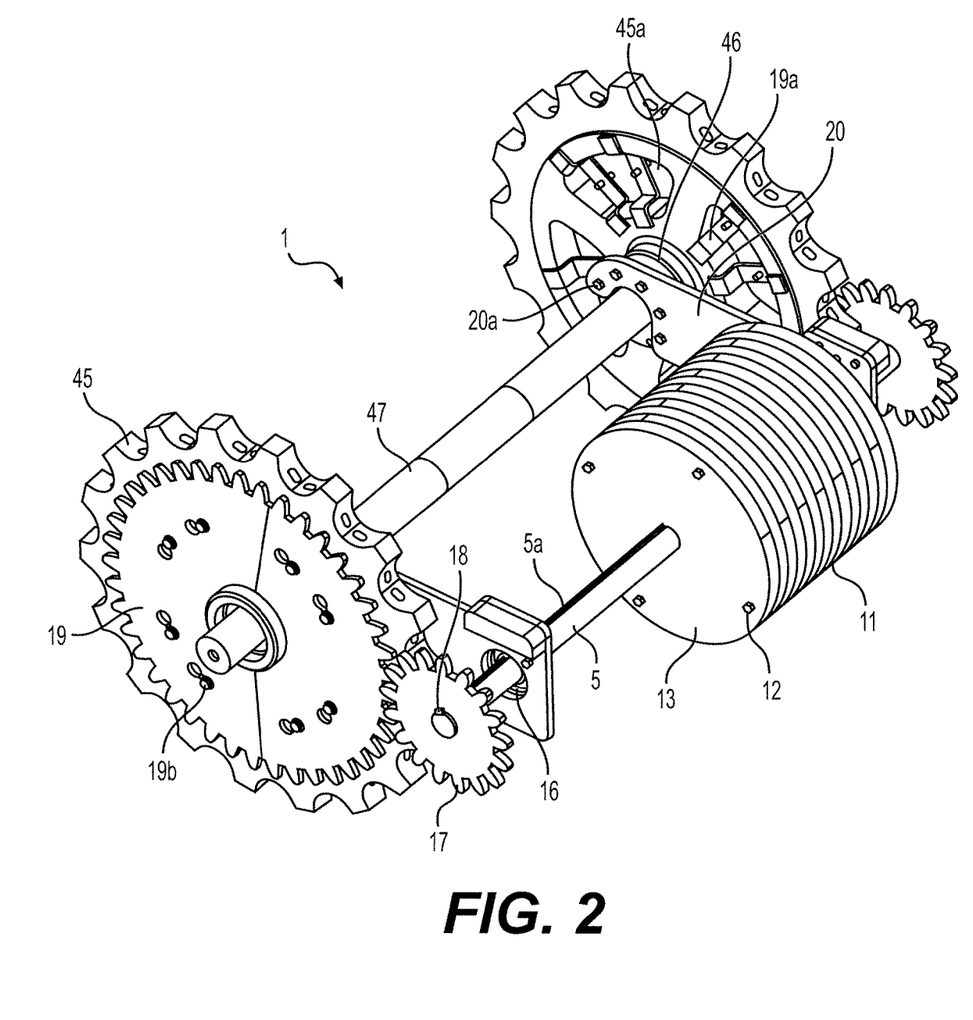
FIG. 2 illustrates a perspective view of the mass damper system of the present application.

FIG. 2 illustrates a perspective view of the mass damper system of the present application. FIG. 2 illustrates a mass damper system 1 including a shaft 5, a plurality of spring plates 9 (also illustrated in see FIG. 3) connected to and extending from the shaft 5, a plurality of weights 11. Each weight 11 is provided on and attached to at least respective one of the plurality of the spring plates 9. End plates 13 are connected to ends of the outermost pair of weights 11, a gear 17, which may be any known gear, is disposed on one or both ends of the shaft 5 and at least one gear 19 is included. Additional gears may be provided.

The gear 17 is fixed in place and connected to the shaft 5 via a fastening member 18 that engages a keyway 5a of the shaft 5. The fastening member 18 may be a key. Further, one or more brackets 20 are provided, each bracket 20 may include a bearing 16. The shaft 5 engages each bearing 16, and the bearing 16 rotates with respect to the shaft 5 and fixes the shaft 5 in place. The brackets 20 may be affixed via fasteners 20a to a respective hub 46. The mass damper system 1 may be provided with two hubs 46 and two gears 17, or may alternatively be provided with any number of hubs and gears. Further, the mass damper system 1 may be provided at any location on the pedestrian conveyor, such that the bracket 20 may be attached to any location along the pedestrian conveyor, and may be affixed by any known fastening means, such as screws, bolts, brazing, welding, or the like.

The bracket 20 is attached to the respective axle hub 46 by a plurality of fasteners 20a. Specifically, the bracket 20 is connected to a respective axle hub 46 at a first end thereof, and includes a bearing 16 at a second end thereof. Further, a shaft 47 is provided between two pedestrian conveyor sprockets 45 and is fitted into a respective axle hub 46.

Further, the first end of each bracket 20 includes a curved shape to accommodate the shaft 47. This curved shape may be a substantially "U" shape, or may have any shape to allow for the connection of the bracket 20 to a respective axle hub 46.

Further, each gear 19 may be connected to a respective pedestrian conveyor sprocket 45 via a plurality of bent plates 19a. Specifically, each fastening member 19b is provided through a respective aperture of a respective gear 19, and are attached via a threaded connection or the like, to a respective plate 19a to fix the gear 19 to a front side of the respective conveyor sprocket 45. Each plate 19a contacts at least the back side of the respective conveyor sprocket 45 at least upon connection with the fastening member 19b, the back side of the respective conveyor sprocket 45 being opposite to the front side of the respective conveyor sprocket 45. Further, each plate 19a may include two flange portions contacting the back side of the respective conveyor sprocket 45. The two flange portions, as shown in FIG. 2, allow for each gear 19 to be fixed to the respective conveyor sprocket 45. A plurality of fastening members 19b may be used, including two fastening members 19b for each aperture 45b of the respective conveyor sprocket 45. Further, each plate 19a may include a main body portion including a threaded hole for receiving the respective fastening member 19b. The threaded hole may be provided substantially at a center of the main body portion and a center of each plate 19a, however the threaded hole may be provided along any portion of the fastening member 19b.

An end plate 13 is provided on either side of the plurality of weights 11, and a plurality of fasteners 12 are provided to attach the end plates 13 to the weights 11, and to attach the end plates 13 to one another. Each fastener 12 extends through a respective aperture of a respective weight 11 of a pair of weights 11 to fix/adjoin the weights 11 to one another in a longitudinal direction of the shaft 5.

The fastener 12 attached to the weights 11 and to the end plates may be a threaded rod having a bolt head at one end and a threaded portion at an opposite end, and may further include a nut engaging the threaded portion. However, any known fastener/fastener combination may be used to join the plurality of weights 11 and the ends plates 13 to one another. For instance, four threaded rods may be used and the threaded rods may be equally spaced about a circular path defined by a circular pair of adjoining plates. However, any number of fasteners may be used.

The end plates 13 are configured to rotate/oscillate through operation of the pedestrian conveyor and they are not fixed to the keyway 5a of the shaft 5. Further, the end plates 13 may oscillate during operation of the pedestrian conveyor.

Figure 4:
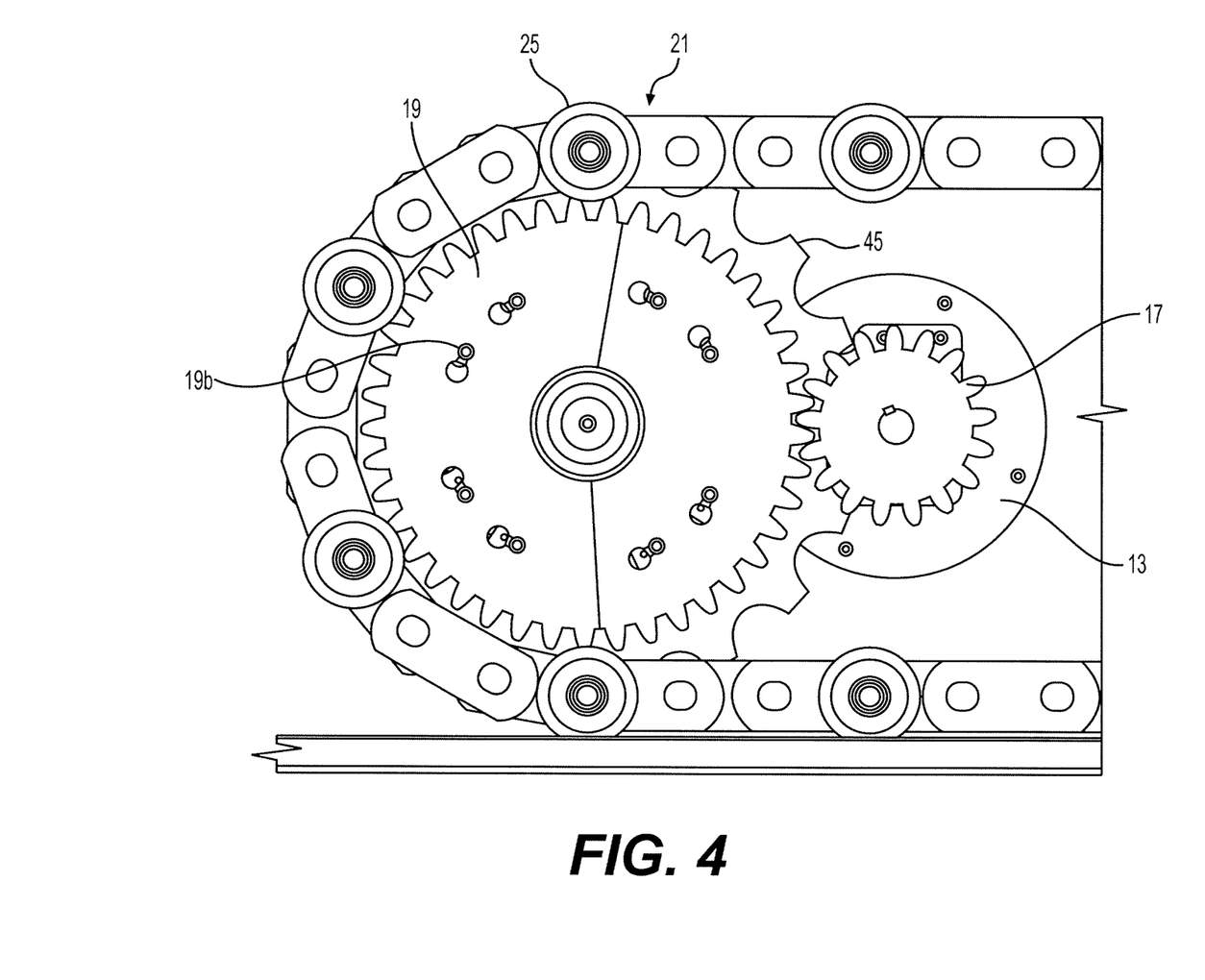
FIG. 4 illustrates a side cross-sectional view of the mass damper system provided within a pedestrian conveyor truss frame.

The gear 17 of the mass damper system 1 may engage a gear 19. The gear 19 rotates with the sprocket that directly drives the step chain band 21, as illustrated in FIG. 4, or drives any other known gear in the pedestrian conveyor system.

The gear 17 of the mass damper system 1 may be sized to reduce the amount, size and number of weights needed to damper the pulsating/vibrational forces of the pedestrian conveyor to a predetermined level. For instance, a smaller gear 17 increasing the gear ratio may be used to reduce the amount, size and number of weights.

Figure 6:
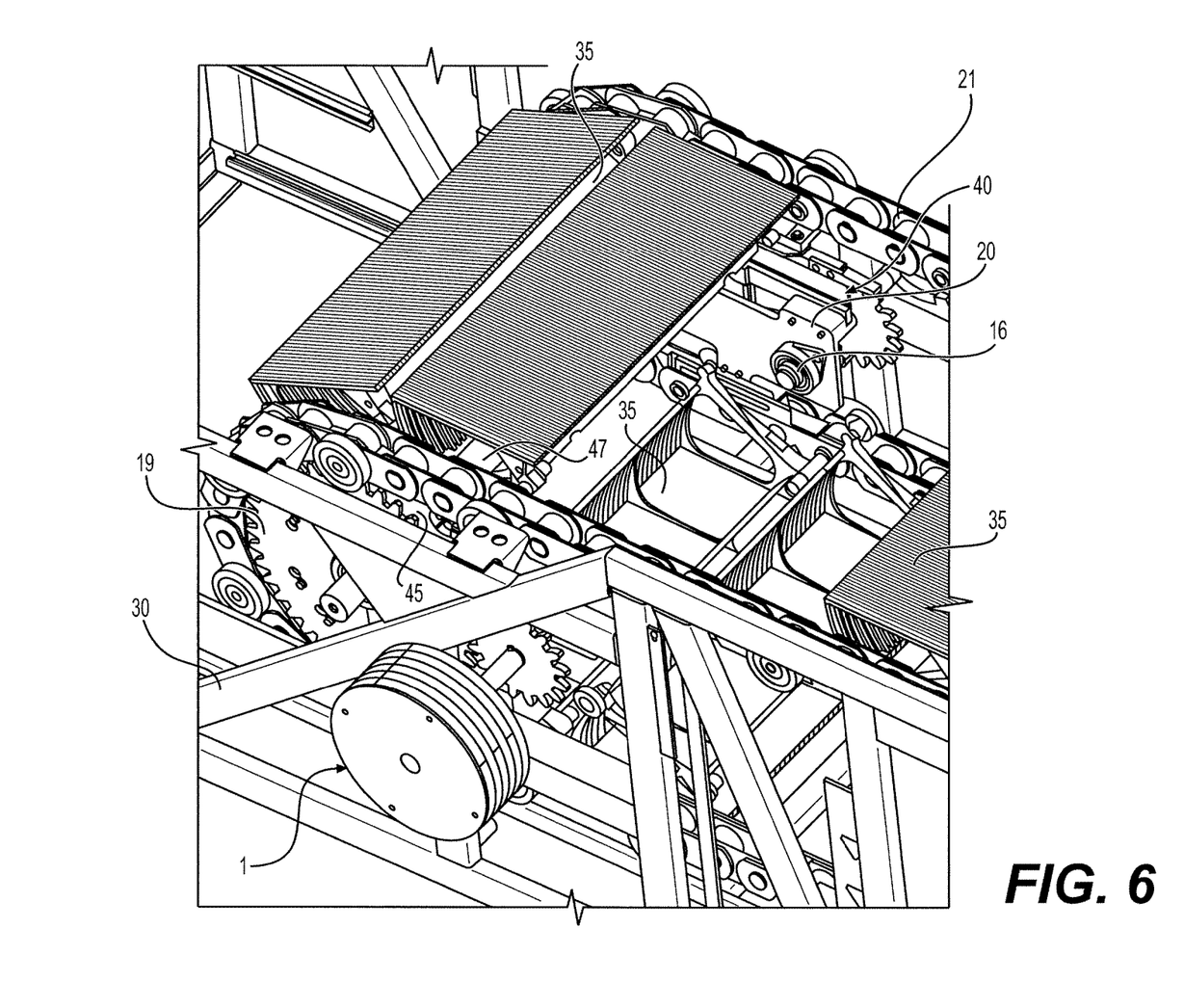
FIG. 6 illustrates a perspective view of the mass damper system with weights extending outside of the pedestrian conveyor truss frame.
Figure 7:
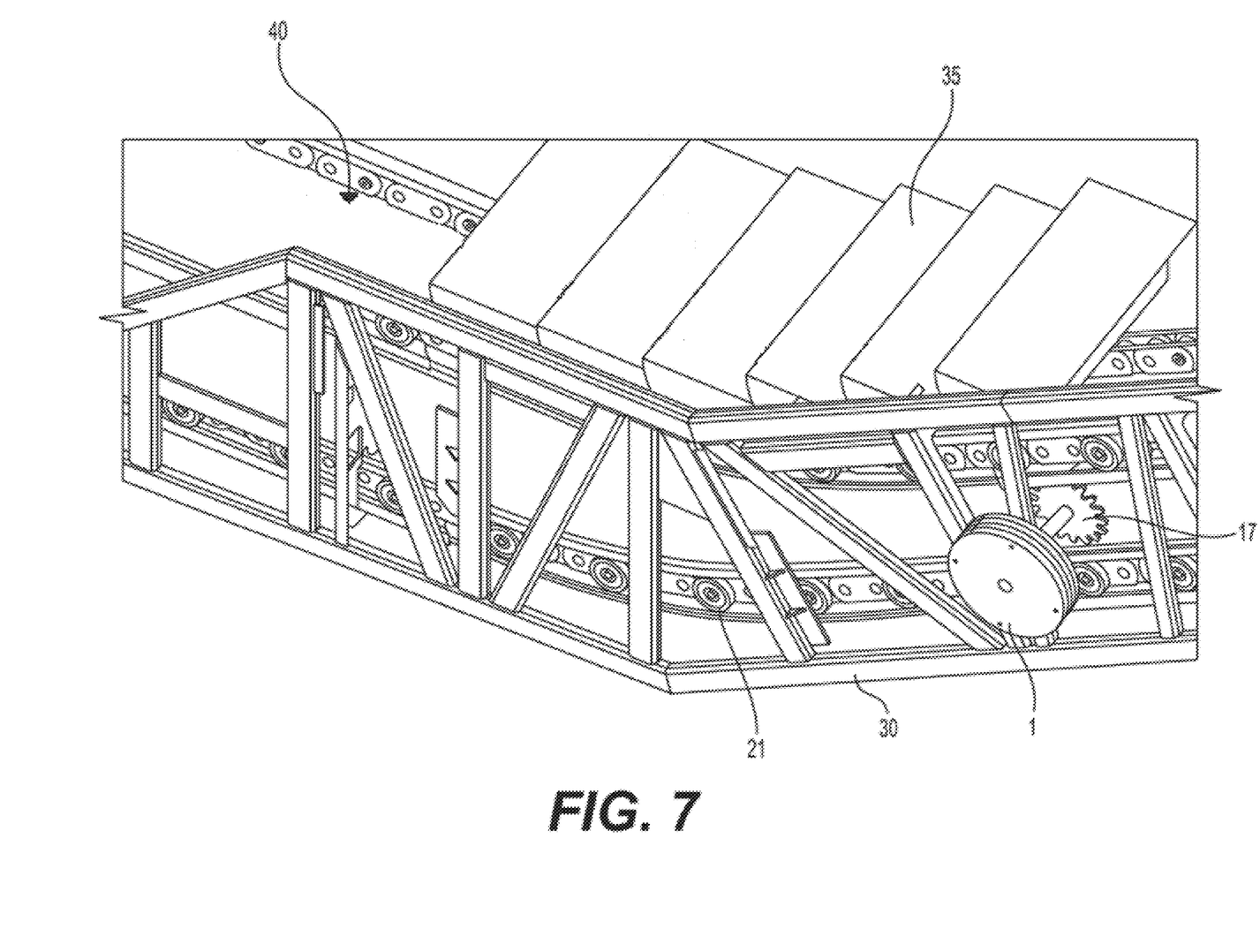
FIG. 7 illustrates a perspective view of the mass damper system with the weight plates extending outside of the pedestrian conveyor truss frame, in a different location from the mass damper system of FIG. 6.

The gear 17 of the mass damper system 1 interacts with the gear 19, which directly connects to the sprocket 45 of the pedestrian conveyor. In other words, the gear 19 experiences excitation and/or vibration during operation of the pedestrian conveyor through its connection to the sprocket 45 of the pedestrian conveyor, and the mass damper system 1 of the present application dampens this vibration, which is a result of pulsing due to the polygon effect, as described above. Alternatively, the gear 17 of the mass damper system may directly engage the step chain band 21, as illustrated in FIG. 7. FIG. 2 illustrates a pair of gears 17 and a pair of gears 19, however, a single gear 19 and a single gear 17 may be used, as illustrated in FIGS. 6 and 7.

The gears 17 and 19, the weights 11, the shaft 5 and the brackets 20 may comprise any known material, preferably, they comprise a metal material.

Figure 3:
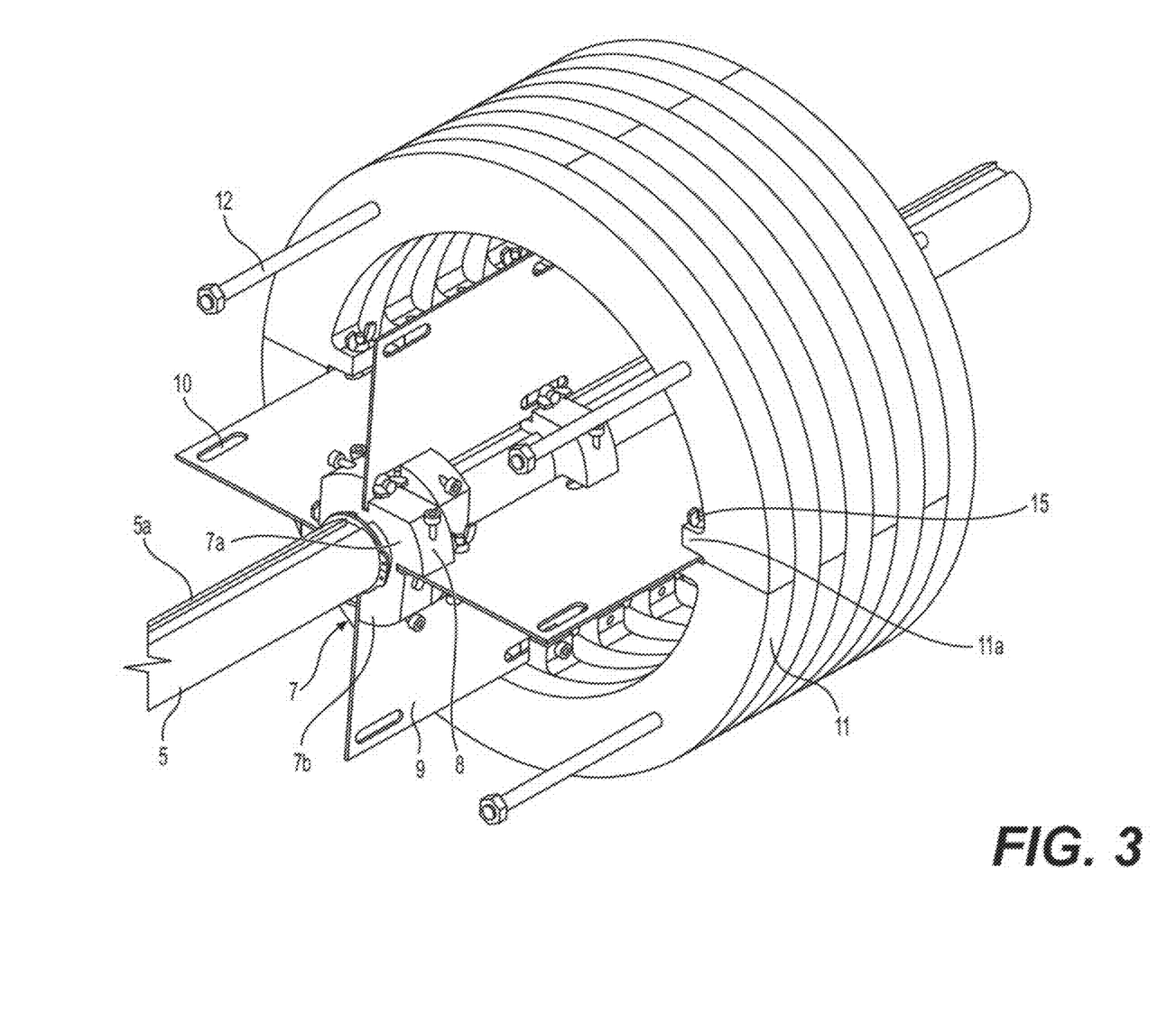
FIG. 3 illustrates a perspective view of the interior of the weights, including spring plates and a shaft.

FIG. 3 illustrates a perspective view of the interior of the weights 11, including the spring plates 9 and the shaft 5. As shown in FIG. 3, the shaft 5 is provided with a keyway 5a extending throughout the entirety of its length (i.e., along its longitudinal axis), which is used for attaching the spring plates 9 thereto via a respective flange member 7 and for attaching the gear 17 to the shaft via a key 18 to ensure that the gear 17 rotates without binding.

The spring plates 9 are configured to absorb a rotational vibration force by rotating in response to a load (i.e., operation of the pedestrian conveyor). In other words, the spring plates 9 are sized so that they have a natural frequency similar to the pulsing frequency, and so they resonate along with the weights attached to them and provide a resistance to the pulsing of the conveyor. Each spring plate 9 is attached to the keyway 5a of the shaft 5 via flanges 7 and fasteners 8. A plurality of pairs of flanges 7 may be used to attach each of the spring plates 9 to the shaft 5. A first flange 7a from each pair of flanges 7 includes an interior shape that corresponds to the shape of the keyway 5a and is disposed in the keyway 5a to connect the flanges 7 to the shaft 5. Further, the second flange 7b of the pair of flanges 7 may be affixed to the first flange 7a via the fasteners 8 to lock/fix the pair of flanges 7 with respect to the shaft 5. The fasteners 8 may be a bolt, screw, or any known fastener.

Each of the plurality of weights 11 may be in the form of a semi-circular plate. The weights 11 may be provided in pairs on the shaft 5 in a radial plane of the shaft and the pairs of weights 11 may abut adjacent pair(s) of weights along a longitudinal direction of the shaft to create a stack of weights 11. The pairs of weights 11 may be symmetric about a central axis of the shaft 5 in a radial direction of the shaft 5.

Each weight 11 may form a C-shape with the ends/end faces of the C-shape attached to corresponding ends/end faces of an adjacent weight 11 at respective radial positions to form a pair of weights 11 having a circular shape, as illustrated in FIG. 3. However, any shape of the weights 11 may be used. It is preferred that the weights are symmetric about the central axis of the shaft. Each end face may comprise a flat surface to abut flush against a respective end face of an adjacent weight 11. Further, each weight 11 may be provided with a flange 11a at its end face for connecting the weight 11 to a respective spring plate 9 and to a flange 11a of the adjacent weight 11 to form a fixed pair of weights. The ends of each weight 11 may be attached to corresponding spring plates 9 via an aperture 10 of the spring plate 9. For instance, the spring plates 9 may be provided with an aperture/slot 10 for receiving a fastener 15 that extends from the flange 11a of one weight 11, through a respective spring plate 9 and to another weight 11, to fix the two adjacent weights 11 and the spring plate 9 to one another. FIG. 3 illustrates four spring plates 9 and eight (8) pairs of adjacent weights 11, However, there may be any number of weights 11 and spring plates 9.

FIG. 4 illustrates a side cross-sectional view of the mass damper system 1 provided within a pedestrian conveyor truss frame 30 (also see FIG. 5), illustrating the interaction between a chain band 21, which may be a step chain band 21, the gear 19, and the mass damper system gear 17. The gear 19 is fixed to the sprocket 45 via brackets 19a and corresponding fasteners 19b that extend through holes in the gear 19 and fix to threaded holes in the brackets 19a. The step chain band includes a plurality of rollers 25 and a plurality of chain guides 23.

Each gear 19 is connected to the pedestrian conveyor sprocket 45 via a plurality of brackets 19a and corresponding fastening elements 19b.

Figure 5:
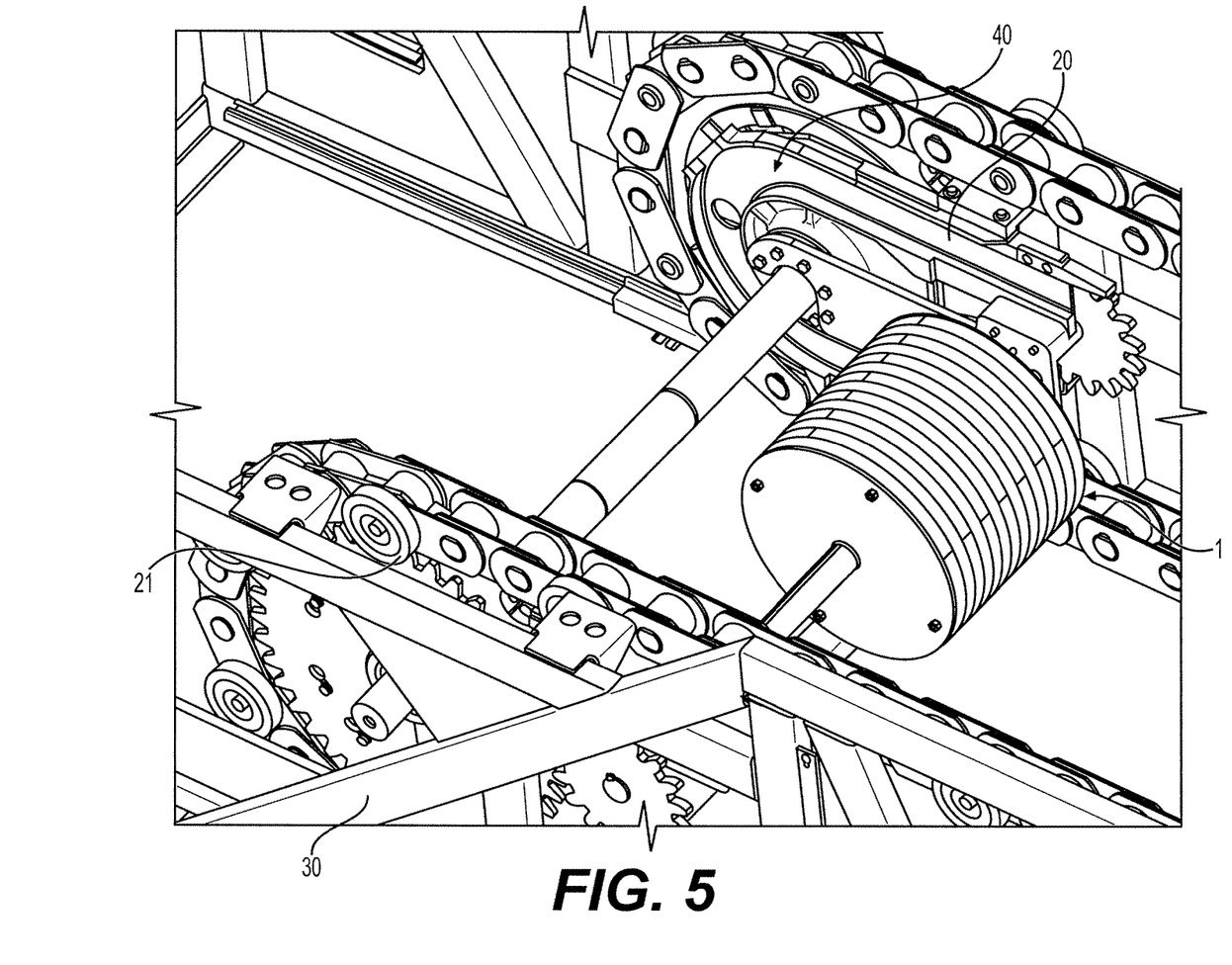
FIG. 5 illustrates is a top perspective view of the mass damper system of the present invention installed within a step band of a pedestrian conveyor and at the conveyor return station.

FIG. 5 is a top perspective view of the mass damper system 1 of FIG. 2 of the present invention installed within the escalator truss frame 30, where the mass damper system 1 is located at a return station 40 for steps of the pedestrian conveyor. The brackets 20 of the mass damper system 1 are attached to a return station 40 of the pedestrian conveyor via fasteners.

FIGS. 6 and 7 illustrate a perspective view of the mass damper system 1 with the weights 11 extending outside of the escalator truss frame 30. In FIG. 6, the gear 19 of the mass damper system 1 may engage directly with the step chain band 21 or may engage with any gear, including a step chain gear or with the sprocket 45. As illustrated in FIGS. 6 and 7, the weights 11 can be installed on the outside of the conveyor truss frame 30 and can be driven independently without connecting the left and right sides at any location along either side. The frame 30 may be any known frame type used in the pedestrian conveyors. Further, the step chain band 21 may directly drive steps 35 of the pedestrian conveyor. FIG. 7 illustrates the mass damper system 1 provided at a different location along the pedestrian conveyor than what is illustrated in FIG. 6. Specifically, the mass damper system 1 may be provided on an incline of the pedestrian conveyor, as opposed to a horizontal area near the return station 40, or may be provided in any other location. For moving walkways and the like, the mass damper system 1 may be provided at any location along the moving walkway. The gear 17 is shown spaced from the step chain band 21 for illustration purposes, however, it may directly engage with the step chain band 21 through other gears that engage with the step chain band 21.

Further, multiple mass damper systems 1 may be provided outside of the conveyor truss frame 30 at multiple locations throughout the pedestrian conveyor system. The multiple locations may be determined based on an analysis of the operating vibrations of the pedestrian conveyor at different speeds. Each mass damper system may be installed in a location at or proximate to areas which have a vibration greater than a predetermined vibration for a given operational speed and a given operational load. The operational speed is the speed of the pedestrian conveyor during its use, and the operational load is the load applied to the pedestrian conveyor during its use.

The mass damper system of the present invention may be connected to any location on the pedestrian conveyor, and may be connected directly to the step chain band or may be connected to the step band sprocket, or connected to any other gear of the pedestrian conveyor. The mass damper system may include weights in the middle of the pedestrian conveyor and the shaft may driven by gears from the sprockets on both sides of the weights when the mass damper is installed, as illustrated in FIGS. 2 and 5.

Using the gear 19 and the gear 17 (i.e., a gear box) allows for the effective inertia of the mass damper to be amplified by the square of the step up ratio, thereby reducing the required size and weight of the tuned mass damper significantly. Preferably, the effective mass of a tuned mass damper must be 2-5% of the machinery mass, to damp effectively. In this case, with several tones of step chain band to be damped, a gear ratio of six (6), for example would reduce the needed mass by a multiple of 36.

The mass damper system 1 of the present invention may be retrofitted to any known pedestrian conveyor by engaging the sprocket of the mass damper system to any gear or directly to the step chain band. Further, multiple mass damper systems 1 may be applied to the pedestrian conveyor. The method for retrofitting includes using a vibration analysis tool, which may include a PMT™ EVA-625 Elevator Vibration Analysis System, while the pedestrian conveyor system is operating, to measure the vibration of the entire pedestrian conveyor system at different fixed speeds. If the level of vibration exceeds a predetermined amount, the mass damper system described above may be added to any location of the pedestrian conveyor system, including a location having vibration levels greater than the predetermined amount.

Further, the number and the location of the weights may be determined based on the location having the greatest vibration levels and the gear 19 and the gear 17 of the mass damper system 1 may be sized accordingly to reduce the size and number of weights 11 for a given application. In particular, due to space restrictions of an existing pedestrian conveyor system, the sprocket may be sized accordingly to allow for the reduction of the size and/or the number of weights used.

Figure 8:
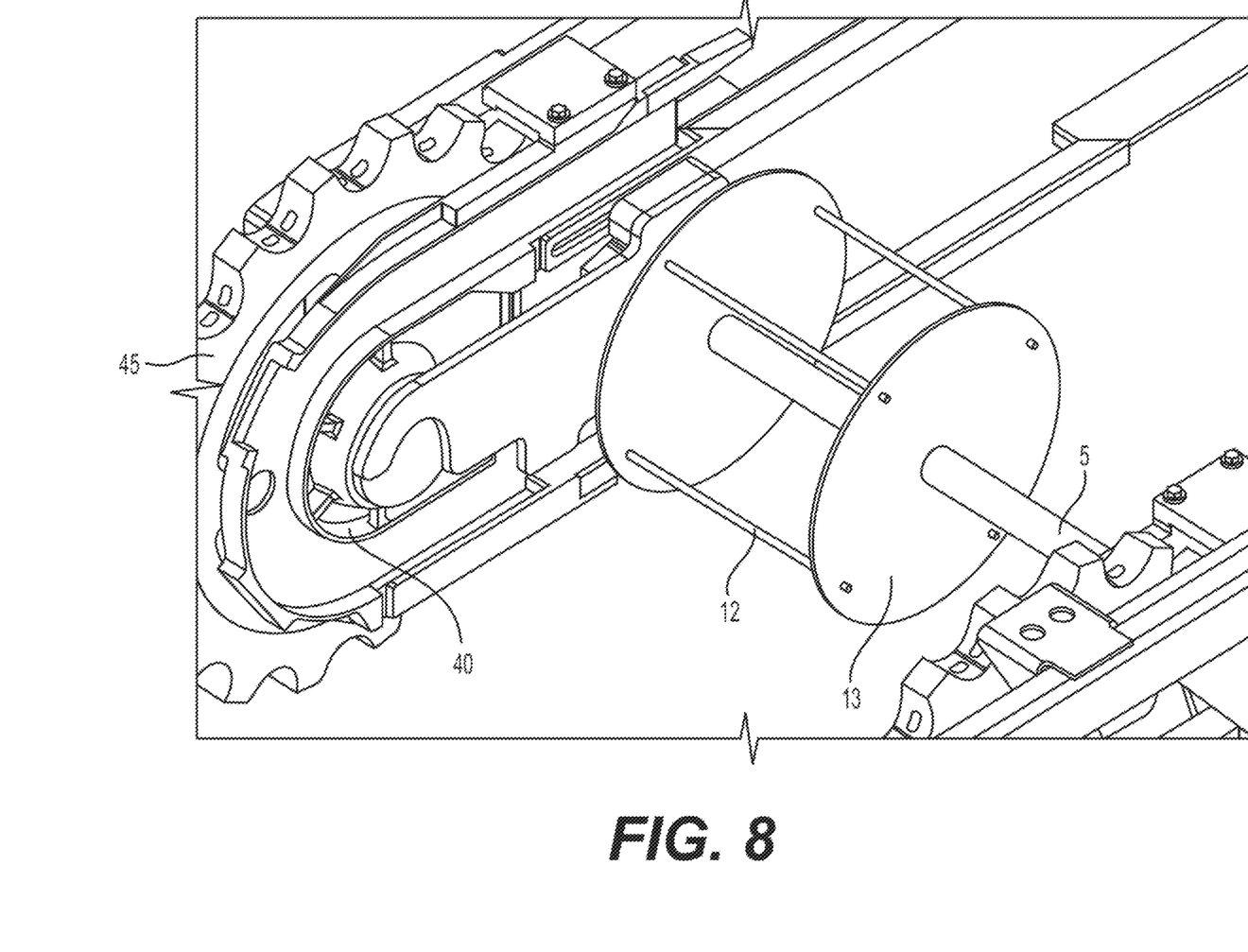
FIG. 8 illustrates a perspective view of retrofitting the mass damper system of the present invention into an existing pedestrian conveyor, including a step of attaching brackets, a shaft and end plates.

The method for retrofitting the mass damper system of the present invention includes installing the shaft 5 into an existing pedestrian conveyor construction via one or more brackets, such as the brackets 20 illustrated in FIG. 2. A shaft 5 extends through the bearing 16 of each of the one or more brackets 20 and end plates 13 are provided on the shaft 5, as described above. The brackets 20 are affixed to a component of the pedestrian conveyor system via any known fastener system. For instance, the brackets 20 may be installed onto a return station 40 of the pedestrian conveyor, as illustrated in FIG. 8, wherein the return station 40 includes a sprocket 45 that engages a step chain band 21 of the pedestrian conveyor. Further, the shaft 5 may include a gear 17, as illustrated in FIG. 2, which engages a gear 19, and the gear 19 may engage the gear 45 of the return station 40. In FIG. 8, the shaft 47 is omitted merely to emphasize the connection between the end plates 13, however, the return station 40 is provided with a shaft 47 extending between two axle hubs 46, as illustrated in FIG. 2.

The end plates 13 are connected to one another by a plurality of fasteners 12, and a gap is provided between the end plates 13, defined by the fasteners 12 to allow for the insertion of spring plates 9 and the weights 11. The fasteners 12 may include a plurality of threaded rods which are fixed to each end plate via nuts, however, any known fasteners may be used.

Figure 9:
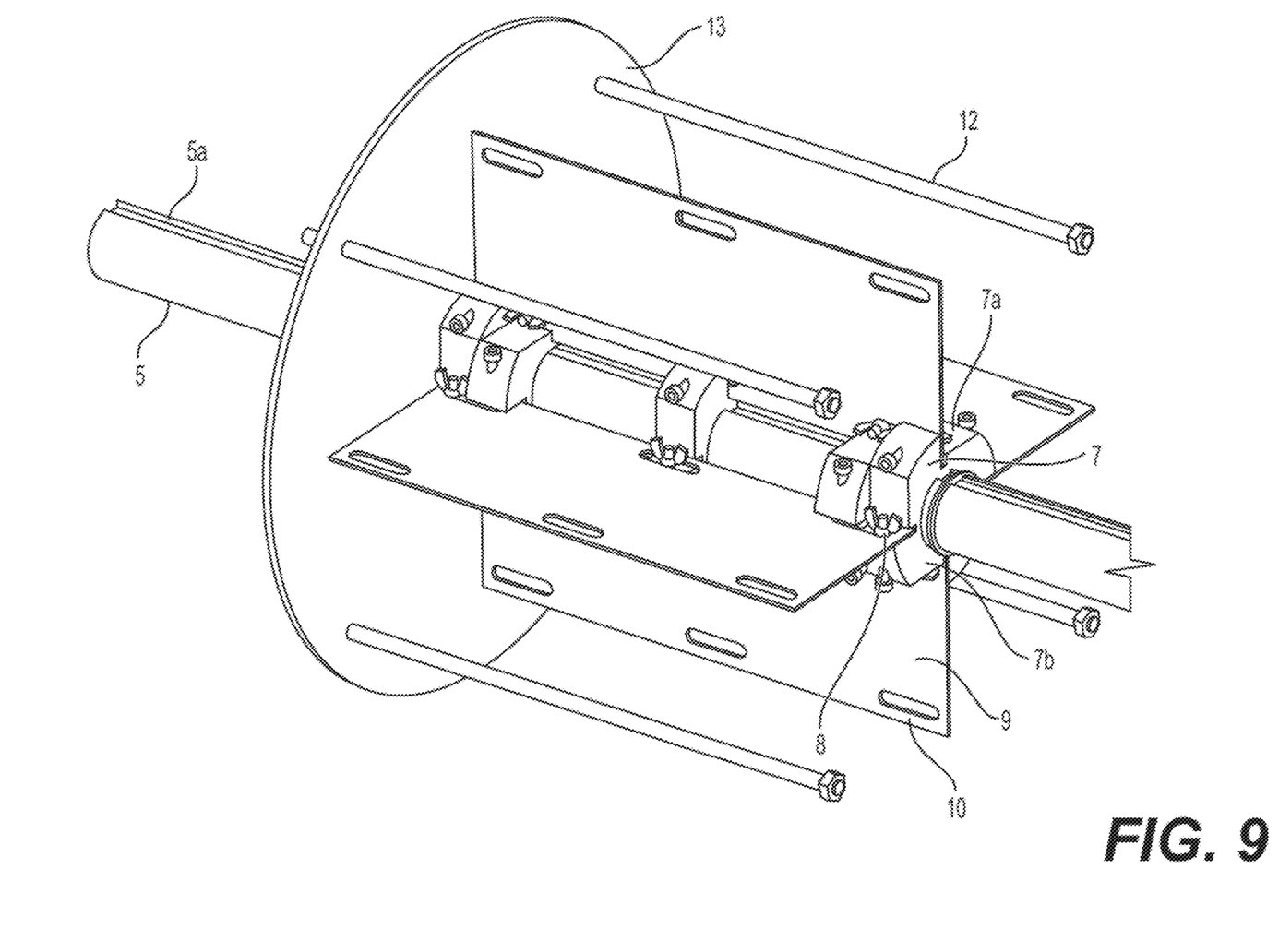
FIG. 9 illustrates a step performed after the step of FIG. 8, including attaching spring plates to the shaft.

FIG. 9 illustrates a step of attaching spring plates 9 to the shaft 5, with one of the end plates 13 omitted for illustration purposes. Each spring plate 9 is attached to the keyway 5a (see FIG. 3) of the shaft 5 via flanges 7 and fasteners 8. A plurality of pairs of flanges 7 may be used to attached each of the spring plates 9 to the shaft 5, where a first flange 7a from each pair of flanges 7 includes an interior shape that corresponds to the shape of the keyway 5a and is disposed in the keyway 5a to connect the flanges 7 to the shaft 5. Further, the second flange 7b of the pair of flanges 7 may be affixed to the first flange 7a via the fasteners 8 to lock/fix the pair of flanges 7 with respect to the shaft 5. The fasteners 8 may be a bolt, screw, or any known fastener.

Figure 10:
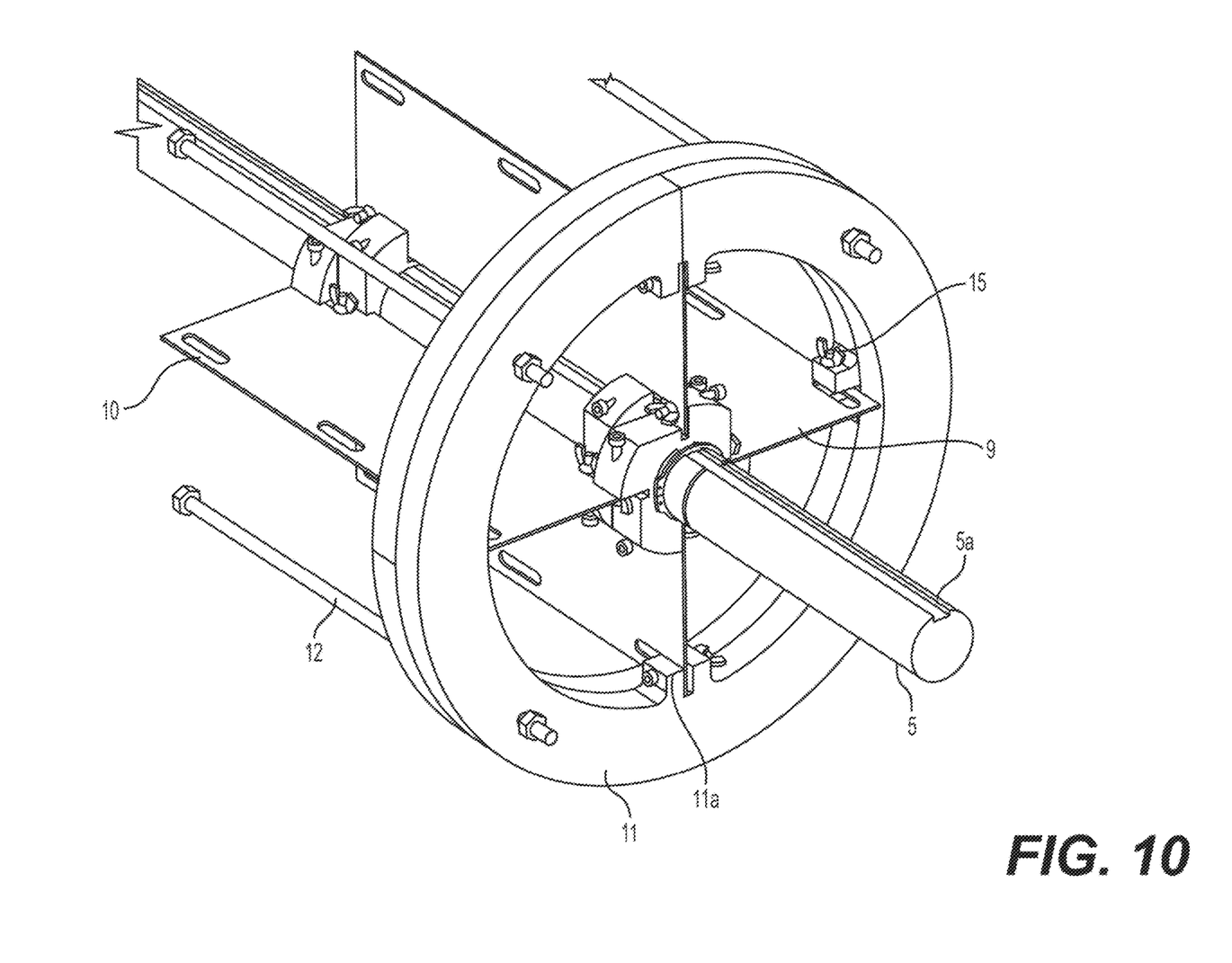
FIG. 10 illustrates a step performed after the step of FIG. 9, including attaching weights to the spring plates, the shaft and the end plates.

FIG. 10 illustrates a step performed after the step of FIG. 9, including attaching a predetermined number of weights 11 to the spring plates 9, the shaft 5 and the end plates 13 via fasteners 15. The end plates 13 are omitted from FIG. 10 to better illustrate the connection between adjacent weights 11 and the connection between the weights 11 with the spring plates 9. As described above, each end face may comprise a flat surface to abut flush against a respective end face of an adjacent weight 11. Further, each weight 11 may be provided with a flange 11a at its end face for connecting the weight 11 to a respective spring plate 9 and to a flange 11a of the adjacent weight 11 to form a fixed pair of weights. The ends of each weight 11 may also be attached to corresponding spring plates 9 via an aperture 10 of the spring plate 9. For instance, the spring plates 9 may be provided with a slot 10 for receiving a fastener 15 that extends from the flange 11a of one weight 11, through a respective spring plate 9 and to another weight 11, to fix the two adjacent weights 11 and the spring plate 9 to one another. FIG. 3 illustrates four spring plates 9 and eight (8) pairs of adjacent weights 11, however, there may be any number of weights 11 and spring plates 9.

FIG. 10 illustrates one method of attaching the weights 11 to the shaft 5, however, any other known method for attaching weights 11 to a shaft 5 may be employed, such as using a clamp, spring collar, bolts or other fastening members. Further, the weights 11 may be attached to the shaft 5 via adhesion (i.e., a glue, resin or the like connection), welding, brazing, using a shaft coupling with set screw, or by any known means. An aperture 10 of each weight 11 may be threaded to mate to a corresponding threaded portion of the shaft 5, the threaded portion of the shaft 5 being spaced from the bearings 16, in order to position the weights along the longitudinal axis of the shaft 5. After positioning, the weights 11 may be attached to the shaft 11 using a clamp, spring collar, a shaft coupling with set screw, or other coupling members.

Figure 11A:
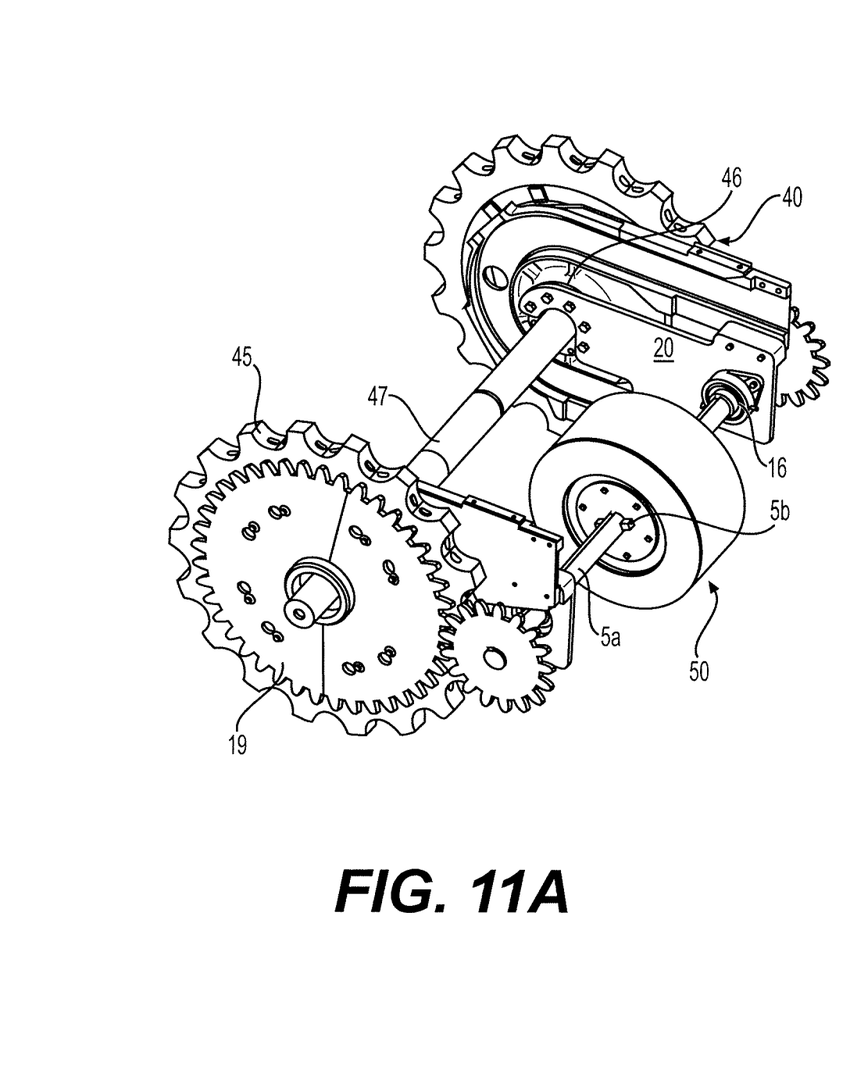
FIGS. 11A and 11B are illustrations of an alternative mass damper system 50 of the present invention.
Figure 11B:
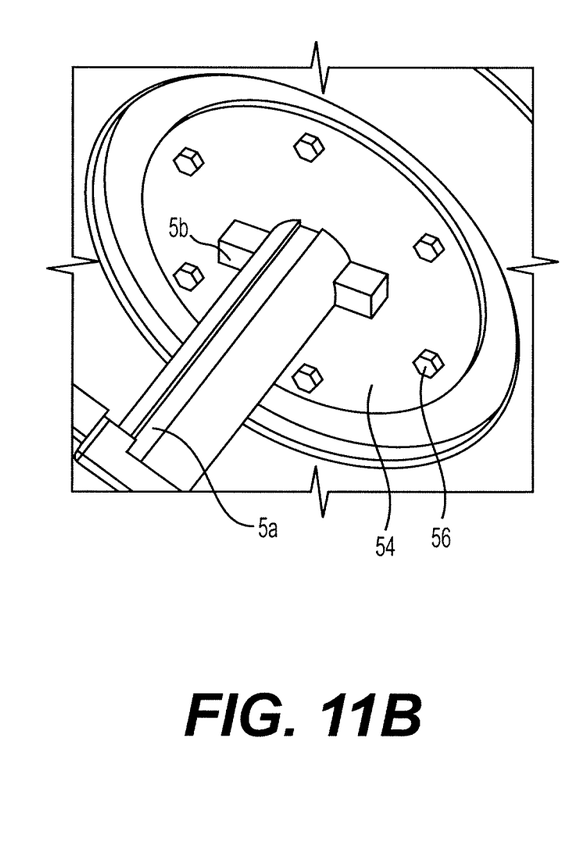

FIGS. 11A and 11B illustrate another mass damper system 50 of the present invention, in which a torsional or viscous type mass damper, as known in the art, is attached to the shaft 5 of the pedestrian conveyor of FIGS. 2-10. In other words, the FIG. 11 shows a different type of mass damper system 50 attached to the bracket 20 via a shaft 5, and the shaft 5 is connected to bearings 16 in the manner described above. Further, the bracket 20 is attached to an axle hub 46 via fastening member 20a, a gear 19 is attached to the pedestrian conveyor sprocket 45, and a shaft 47 is provided between the axle hubs 46, in the manner described above.

The torsional mass damper may include a plurality of spaced apart weights located within an outer housing, which may be a cylindrical housing and a spring located between each of two adjacent weights, and friction members engaged with the weights to provide torsional damping. During operation of the pedestrian conveyor, vibration causes the shaft 5 to rotate, which therein causes the cylindrical housing to rotate, and thus the friction members to engage with the outer housing or another component of the torsional mass damper, thus providing torsional damping.

An alternate type of torsional mass damper such as the viscous type mass damper may have an outer housing, which may be a cylindrical housing, an inertia ring provided within the outer housing, and a viscous fluid provided between the outer housing and the inertia ring. The outer housing may be directly connected to the shaft 5 and may move with shaft rotation. Inside, the inner inertia ring freely rotates in a layer of the viscous fluid. Due to pulsing during to operation of the pedestrian conveyor, the outer housing and inner inertia ring rotate independently at different speeds. The resulting shear action through the viscous fluid diminishes the vibration by transforming it to heat.

FIG. 11B is a zoomed in portion of the mass damper system 50 to emphasize the connection of the end plates 54 to the mass damper system 50 via fasteners 56, and the connection of the ends plates 54 to the shaft 5.

The mass damper system may be provided with a cylindrical housing.

The shaft 5 of the mass damper system 50 is provided with a stop 5b to prevent the damper 50, including its cylindrical housing, from moving axially along the shaft 5, and includes two end plates 54, each end plate 54 being attached to the mass damper system 50 via bolts 56. The stops 5b may extend transverse to a longitudinal/axial direction of the shaft 5.

In an alternative embodiment, the shaft 5 may be provided with the stop 5b to prevent the damper 50 from moving axially along the shaft 5, and additionally a keyway 5a to prevent rotation of the damper about the shaft 5. In other words, each end plate 54 may be provided with a stop 5b and a keyway 5a to lock the damper 50 to the shaft 5.

As described above with respect to the mass damper system 1, the mass damper system 50 of the alternate embodiment may be installed at various positions along the pedestrian conveyor for mitigating or eliminating pulsing caused by the operation of the pedestrian conveyor.

Further, as described above, multiple mass damper systems 50 may be provided outside of the conveyor frame 30 at multiple locations throughout the pedestrian conveyor system. The multiple locations may be determined in the same manner as described above.

Also as described above, the sprocket 17 may be fixed in place and connected to the shaft 5 via a fastening member 18 that engages a keyway 5a of the shaft 5. Further, one or more brackets 20 are provided. Each bracket 20 may include a bearing 16. The bracket 20 may be attached to an axle hub 46. The shaft 5 engages each bearing 16 and the bearing 16 rotates with respect to the shaft 5 and fixes the shaft 5 in place. The brackets 20 may be provided at any location on the pedestrian conveyor and may be affixed by any known conventional means, such as screws, bolts, brazing, welding, or the like. The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A pedestrian conveyor, including:
   at least one torsional vibration damper system comprising:
      a shaft;
      a cylindrical housing attached to the shaft and being configured to dampen vibrations of the shaft;
      a first gear attached to an end of the shaft; and
      a second gear engaging the first gear; and
   a step chain band connected to the second gear.

2. The pedestrian conveyor of claim 1, wherein cylindrical housing is a viscous damper comprising a viscous fluid.

3. The pedestrian conveyor of claim 1, wherein the cylindrical housing includes a plurality of spaced apart weights and a spring located between each of two adjacent weights.

4. The pedestrian conveyor of claim 1, wherein the shaft includes a plurality of stops extending transverse from an axial direction of the shaft.

5. The pedestrian conveyor of claim 4, wherein each torsional vibration damper system further comprises first and second end plates,
   wherein the first end plate is attached to a first end of the cylindrical housing and the second end plate is attached to a second end of the cylindrical housing, opposite to the first end, and
   wherein the stops are configured to limit movement of the cylindrical housing along an axial direction.

6. The pedestrian conveyor of claim 1, wherein the shaft is provided with a keyway, and
   wherein the cylindrical housing is attached to the shaft via the keyway.

7. A pedestrian conveyor, including:
   a mass damper system comprising:
      a shaft;
      a plurality of spring plates attached to the shaft;
      a plurality of weights connected to the plurality of spring plates;
      a first gear connected to the shaft; and
      a second gear engaging the first gear; and
   a step chain band connected to the second gear.

8. The pedestrian conveyor of claim 7, wherein the plurality of weights abuts one another and are attached to each other via fasteners extending through the plurality of weights.

9. The pedestrian conveyor of claim 8, wherein the mass damper system further includes at least two end plates, each end plate being attached at a respective end of the plurality of weights via the fasteners.

10. The pedestrian conveyor of claim 9, wherein the end plates are configured to rotate about the shaft and are not fixed to the shaft.

11. The pedestrian conveyor of claim 7, wherein each of the spring plates are attached to the shaft via a fastening member that engages a keyway of the shaft.

12. A method of retrofitting a mass damper system onto an existing pedestrian conveyor, the method comprising the steps of:
   providing at least one mass damper system, each mass damper system including:
      a shaft;
      at least one spring plate or at least one cylindrical housing; and
      a sprocket;
   attaching the at least one spring plate or the at least one cylindrical housing to the shaft; and
   attaching the shaft to the pedestrian conveyor via one or more brackets, wherein each bracket includes a bearing engaging the shaft.

13. The method according to claim 12, wherein the bracket is further attached to a step chain gear, wherein the step chain gear directly engages a step chain band of the pedestrian conveyor.

14. The method according to claim 13, wherein the at least one spring plate includes a plurality of spring plates, and wherein each mass damper system further comprises:

a plurality of end plates;

a plurality of weights, and wherein the method further comprises:

attaching the plurality of end plates to the shaft;

after the step of attaching the plurality of end plates to the shaft, providing a plurality of fasteners through each of the end plates and connecting each fastener to each end plate; and attaching the spring plates to the shaft.

15. The method according to claim 14, further comprising attaching each weight to respective spring plates and to an adjacent weight of the plurality of weights.

16. The method according to claim 15, wherein each weight is attached to a respective spring plate at an end face thereof, and wherein each weight includes two end faces.

17. The method according to claim 16, wherein the end faces of each weight abut respective end faces of an adjacent weight to form pairs of weights, and wherein each pair of weights and the respective spring plate are attached to one another via fasteners.

18. The method of claim 12, the method further comprising:

performing a vibrational analysis of the pedestrian conveyor during operation of the pedestrian conveyor to determine vibration levels at steps of the pedestrian conveyor; and wherein the step of performing the vibrational analysis is performed before the step of attaching the shaft to the pedestrian conveyor.

19. The method of claim 18, further comprising:

after performing the vibrational analysis, determining whether vibrational levels exceed a predetermined threshold; and installing the at least one mass damper system at a respective location that has a vibration level that exceeds the predetermined threshold.

20. The method of claim 12, wherein the shaft is provided with a keyway, and wherein the method further comprises attaching the at least one spring plate or the at least one cylindrical housing to the shaft via a fastening member that engages the keyway of the shaft.

* * * * *